(12) United States Patent
Lee et al.

(10) Patent No.: US 10,364,837 B2
(45) Date of Patent: Jul. 30, 2019

(54) DUAL-SHAFT SYNCHRONOUS TRANSMISSION DEVICE AND TRANSMISSION MODULE

(71) Applicant: FIRST DOME CORPORATION, New Taipei (TW)

(72) Inventors: Wang-Ju Lee, New Taipei (TW); Chin-Yu Hsiao, New Taipei (TW)

(73) Assignee: FIRST DOME CORPORATION, New Taipei (TW)

( * ) Notice: Subject to any disclaimer, the term of this patent is extended or adjusted under 35 U.S.C. 154(b) by 265 days.

(21) Appl. No.: 15/374,904

(22) Filed: Dec. 9, 2016

(65) Prior Publication Data

US 2018/0058498 A1  Mar. 1, 2018

(30) Foreign Application Priority Data

Aug. 24, 2016  (TW) .............................. 105212891 U

(51) Int. Cl.
| | | |
|---|---|---|
| *F16C 11/04* | (2006.01) | |
| *F16H 21/44* | (2006.01) | |
| *G06F 1/16* | (2006.01) | |

(52) U.S. Cl.
CPC .............. *F16C 11/04* (2013.01); *F16H 21/44* (2013.01); *G06F 1/1616* (2013.01); *G06F 1/1681* (2013.01)

(58) Field of Classification Search
CPC .... G06F 1/1616; G06F 1/1681; G06F 1/1618; E05D 3/12; Y10T 16/53825; Y10T 16/53826; Y10T 16/53843; Y10T 16/53845; Y10T 16/53848
See application file for complete search history.

(56) References Cited

U.S. PATENT DOCUMENTS

| | | | | |
|---|---|---|---|---|
| 8,514,558 B2 * | 8/2013 | Song | ..................... | G06F 1/1624 16/284 |
| 8,701,249 B2 * | 4/2014 | Ahn | ..................... | H04M 1/0216 16/289 |
| 8,938,855 B2 * | 1/2015 | Ahn | ..................... | F16C 11/04 16/354 |
| 9,021,658 B1 * | 5/2015 | Yang | ..................... | G06F 1/1681 16/366 |
| 9,027,205 B2 * | 5/2015 | Ahn | ..................... | G06F 1/1681 16/354 |
| 9,395,761 B2 * | 7/2016 | Yukawa | ............... | G06F 1/1675 |

(Continued)

*Primary Examiner* — Victor D Batson
*Assistant Examiner* — Matthew J Sullivan
(74) *Attorney, Agent, or Firm* — Li & Cai Intellectual Property (USA) Office

(57) ABSTRACT

A dual-shaft synchronous transmission device includes a hinge structure, a driving structure, and a linkage assembly, which are linked with each other. The hinge structure includes a first shaft, a second shaft parallel to the first shaft, and a carrier fixed on the first shaft and having a track slot. The driving structure is sleeved at the first shaft and can be driven by the second shaft. A guiding slot is formed on the outer surface of the driving structure. The linkage assembly includes a linking member sleeved at the guiding slot, a first connecting rod connected to the linking member, a second connecting rod linked to the linking member. The linking member is configured to move along the guiding slot with respect to the driving structure and parallel to the first shaft for driving a column of the second connecting rod in the track slot.

11 Claims, 16 Drawing Sheets

(56) References Cited

U.S. PATENT DOCUMENTS

| | | | | |
|---|---|---|---|---|
| 9,540,855 B2* | 1/2017 | Kato | ............... | E05D 3/12 |
| 9,557,778 B2* | 1/2017 | Sung | ............... | G06F 1/1626 |
| 9,678,541 B2* | 6/2017 | Hsu | ............... | G06F 1/1681 |
| 9,690,332 B2* | 6/2017 | Liu | ............... | G06F 1/1681 |
| 9,777,524 B2* | 10/2017 | Shen | ............... | F16M 11/10 |
| 9,857,833 B2* | 1/2018 | Morrison | ............... | G06F 1/1616 |
| 10,000,955 B2* | 6/2018 | Shang | ............... | G06F 1/1681 |
| 2005/0050686 A1* | 3/2005 | Kurokawa | ............... | G06F 1/1618 |
| | | | | 16/354 |
| 2010/0087232 A1* | 4/2010 | Yeh | ............... | H04M 1/0237 |
| | | | | 455/575.4 |
| 2011/0099756 A1* | 5/2011 | Chen | ............... | G06F 1/1618 |
| | | | | 16/297 |
| 2014/0026368 A1* | 1/2014 | Katsuta | ............... | G06F 1/1624 |
| | | | | 16/362 |
| 2016/0102487 A1* | 4/2016 | Kuramochi | ............... | E05D 3/12 |
| | | | | 361/679.27 |
| 2018/0039250 A1* | 2/2018 | Liang | ............... | F16C 11/04 |
| 2018/0081405 A1* | 3/2018 | Shinotou | ............... | A45C 11/00 |
| 2018/0230724 A1* | 8/2018 | Lin | ............... | E05D 11/06 |
| 2018/0230726 A1* | 8/2018 | Chen | ............... | E05D 11/10 |

* cited by examiner

DUAL-SHAFT SYNCHRONOUS TRANSMISSION DEVICE AND TRANSMISSION MODULE

BACKGROUND OF THE INVENTION

1. Field of the Invention

The instant invention relates to a transmission device; in particular, to a dual-shaft synchronous transmission device and a transmission module.

2. Description of Related Art

The conventional transmission device includes a shaft and a linkage assembly cooperating with the shaft. The shaft has a spiral track, and the linkage assembly has a bump inserted into the track. Thus, when the conventional transmission device is operated, the shaft drives the linkage assembly by using the track to press the bump.

However, the connection between the shaft and the linkage assembly only depends on the bump inserted into the track, so the bump needs to receive huge loading. Thus, the service life of the conventional transmission device is reduced and the bump is easily separated from the track, because the bump is rapidly abraded.

SUMMARY OF THE INVENTION

The instant disclosure provides a dual-shaft synchronous transmission device and a transmission module for effectively solving the problem caused by conventional transmission devices.

The instant disclosure provides a dual-shaft synchronous transmission device, comprising: a hinge structure including: a first shaft having a longitudinal direction; and a second shaft parallel to the first shaft, wherein the second shaft is configured to rotate by taking the first shaft to be a rotation axis; a carrier fixed on the first shaft and having a track slot; a driving structure sleeved at the first shaft and configured to be driven by the second shaft to rotate with respect to the first shaft; wherein an annularly guiding slot is formed on an outer surface of the driving structure, and the guiding slot has a slot bottom, a first flange connected to an end of the slot bottom, and a second flange connected to an opposite end of the slot bottom, wherein the first flange and the second flange face to each other and are not complementary in shape; the first flange has a first hill-shaped edge, the second flange has two second hill-shaped edges, when the first hill-shaped edge is orthogonally projected onto the second flange in a direction parallel to the longitudinal direction to form a projecting region, the projecting region is located between the two second hill-shaped edges; and a linkage assembly including; a linking member having an annular shape and sleeved at the slot bottom of the guiding slot, wherein the linking member is configured to be driven by at least one of the first flange and the second flange to move in the longitudinal direction with respect to the driving structure; a first connecting rod connected to the linking member and movably installed on the carrier, wherein the first connecting rod is configured to move in the longitudinal direction with respect to the carrier; and a second connecting rod pivotally connected to the carrier and having a column inserted into the track slot, wherein the second connecting rod is linked to the first connecting rod, and the first connecting rod is configured to drive the second connecting rod to rotate with respect to the carrier for moving the column in the track slot.

The instant disclosure also provides a transmission module, comprising: a shaft; a carrier fixed on the shaft and having a track slot; a driving structure sleeved at the shaft and configured to rotate with respect to the shaft; wherein an annularly guiding slot is formed on an outer surface of the driving structure, and the guiding slot has a slot bottom, a first flange connected to an end of the slot bottom, and a second flange connected to an opposite end of the slot bottom, wherein the first flange and the second flange face to each other and are not complementary in shape; the first flange has a first hill-shaped edge, the second flange has two second hill-shaped edges, when the first hill-shaped edge is orthogonally projected onto the second flange in a direction parallel to the shaft to form a projecting region, the projecting region is located between the two second hill-shaped edges; and a linkage assembly including; a linking member having an annular shape and sleeved at the slot bottom of the guiding slot, wherein the linking member is configured to be driven by at least one of the first flange and the second flange to move parallel to the shaft with respect to the driving structure; a first connecting rod connected to the linking member and movably installed on the carrier, wherein the first connecting rod is configured to move parallel to the shaft with respect to the carrier; and a second connecting rod pivotally connected to the carrier and having a column inserted into the track slot, wherein the second connecting rod is linked to the first connecting rod, and the first connecting rod is configured to drive the second connecting rod to rotate with respect to the carrier for moving the column in the track slot.

In summary, the linkage assembly of the dual-shaft synchronous transmission device in the instant disclosure is installed on the driving structure by using the annularly linking member to sleeve at the guiding slot, so the linking member is stronger than conventional bumps and the connection between the linking member and the driving structure is more stable than conventional transmission devices.

In order to further appreciate the characteristics and technical contents of the instant invention, references are hereunder made to the detailed descriptions and appended drawings in connection with the instant invention. However, the appended drawings are merely shown for exemplary purposes, rather than being used to restrict the scope of the instant invention.

DETAILED DESCRIPTION OF THE PREFERRED EMBODIMENTS

Please refer to FIGS. 1A through 9B, which show an embodiment of the instant disclosure. References are hereunder made to the detailed descriptions and appended drawings in connection with the instant invention. However, the appended drawings are merely shown for exemplary purposes, rather than being used to restrict the scope of the instant invention.

Figure 1A:
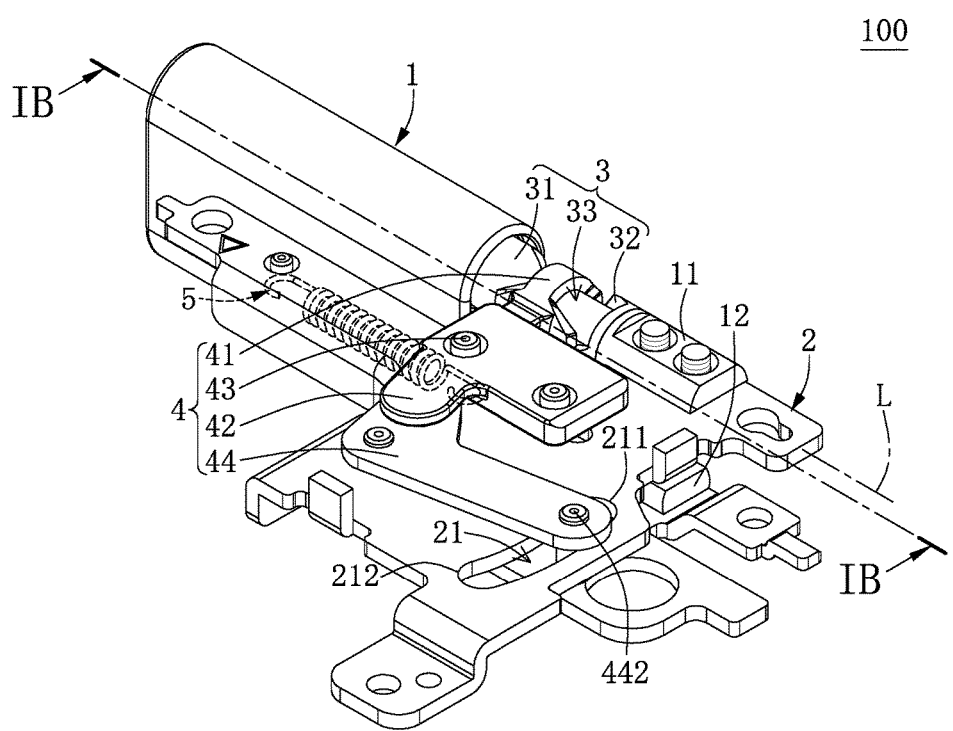
FIG. 1A is a perspective view showing a dual-shaft synchronous transmission device according to the instant disclosure.
Figure 2A:
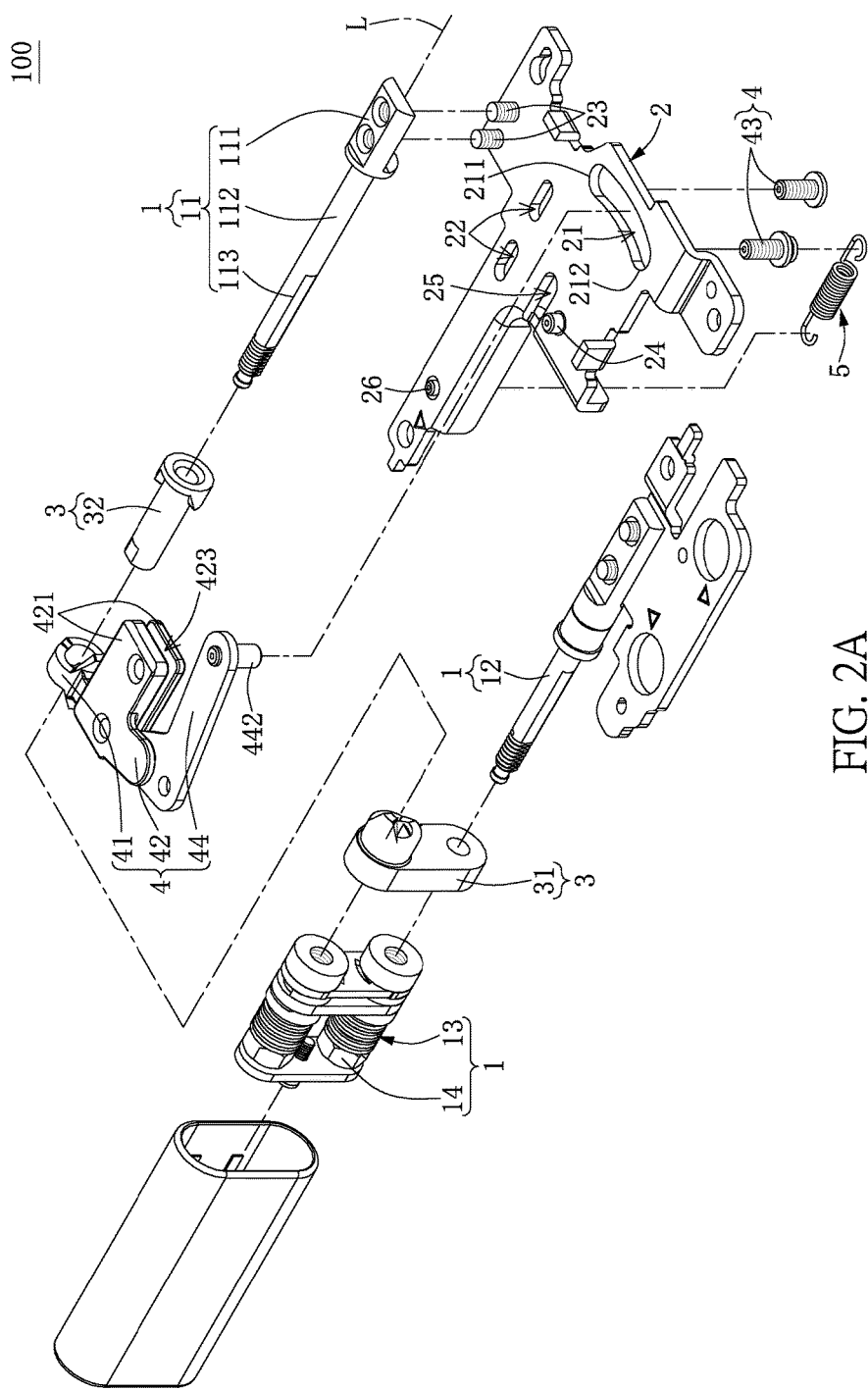
FIG. 2A is an exploded view of FIG. 1A.

Please refer to FIGS. 1A and 2A, which show a dual-shaft synchronous transmission device 100 for mounting on an electronic device having two rotatable compartments (e.g., a notebook PC or a cell phone), but the instant disclosure is not limited thereto. The dual-shaft synchronous transmission device 100 includes a hinge structure 1, a carrier 2 and a driving structure 3 both installed on the hinge structure 1, a linkage assembly 4 installed on the driving structure 3 and the carrier 2, and an elastic member 5 installed on the carrier 2 and the linkage assembly 4.

It should be noted that the movement of the dual-shaft synchronous transmission device 100 is a relative motion, so the figures are fixed part of the components for clearly showing the relative motion of the instant embodiment. The following description discloses the construction of each component of the dual-shaft synchronous transmission device 100, and then discloses the related features of the components.

As shown in FIGS. 2A and 2 B, the hinge structure 1 includes a first shaft 11, a second shaft 12, and a plurality of washers 13 and two nuts 14, which are installed on the first shaft 11 and the second shaft 12. The first shaft 11 having a longitudinal direction L includes a mounting portion 111, a cylindrical portion 112, and a non-cylindrical portion 113. The cylindrical portion 112 and the non-cylindrical portion 113 are sequentially extended from the mounting portion 111. The non-cylindrical portion 113 is provided for inserting into particular components (i.e., the washers 13 and the nut 14), which must be rotated with the first shaft 11. Moreover, the second shaft 12 in the instant embodiment is parallel to the first shaft 11, meaning that the longitudinal direction of the second shaft 12 is parallel to the longitudinal direction L of the first shaft 11. The second shaft 12 is configured to rotate with respect to the first shaft 11 by taking the first shaft 11 to be a rotation axis (as shown in FIGS. 5A through 9B). In addition, the other components of the hinge structure 1 (i.e., the washers 13 and the nuts 14) in the instant embodiment are not disclosed in detail.

Figure 2B:
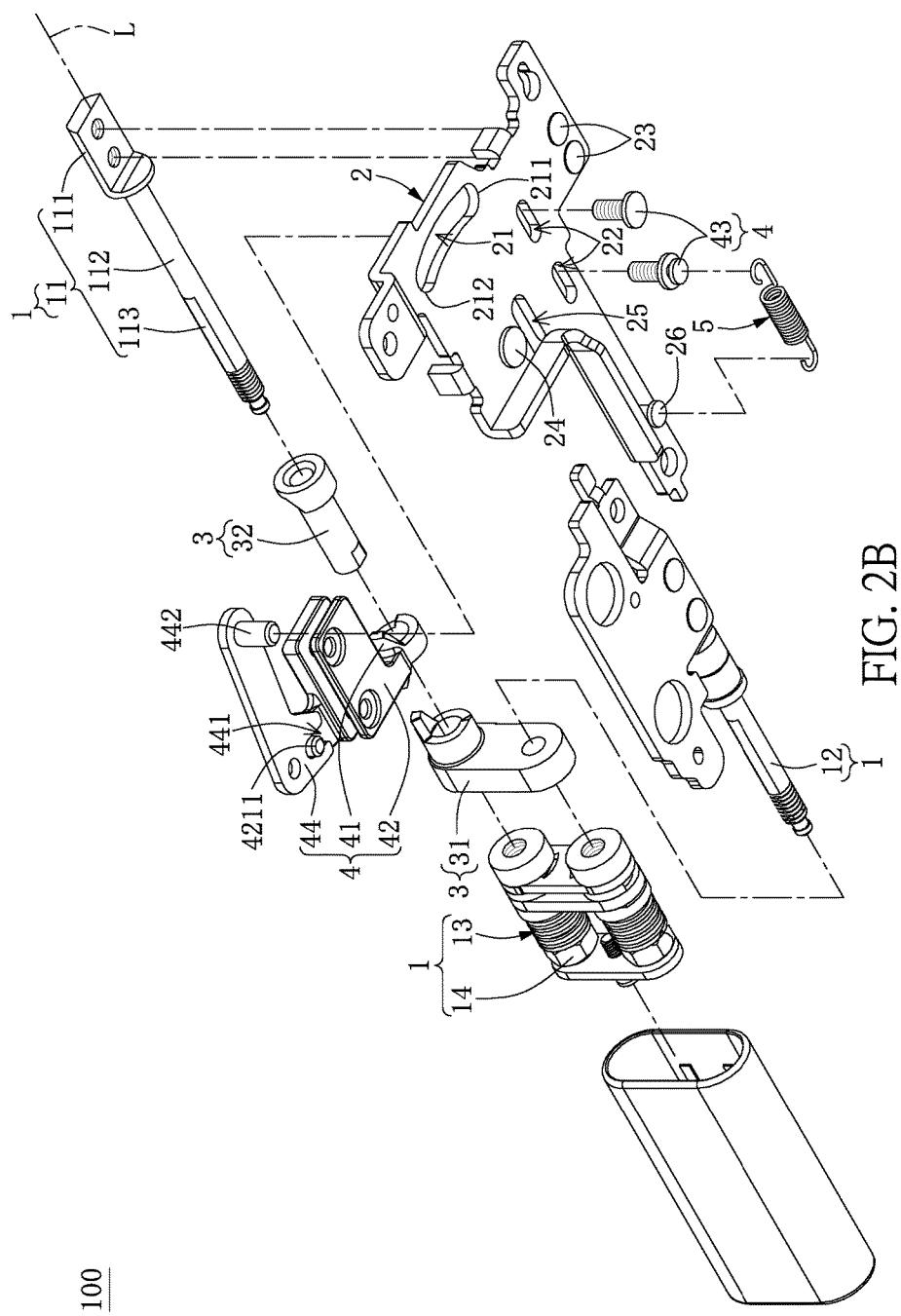
FIG. 2B is an exploded view of FIG. 1A from another perspective.

As shown in FIGS. 2A and 2B, the carrier 2 is fixed on the first shaft 11, and the carrier 2 in the instant embodiment is a plate. The carrier 2 includes two elongated holes 22 arranged in one direction parallel to the longitudinal direction L, a combining portion 23 and a pivotal portion 24 respectively arranged at two opposite sides of the two elongated holes 22, a sliding hole 25 parallel to the longitudinal direction L and arranged between the pivotal portion 24 and the two elongated holes 22, an arc-shaped track slot 21 having a center located at the pivotal portion 24, and a connecting portion 26 arranged in an extending direction of the two elongated holes 22. Moreover, two opposite ends of the track slot 21 are respectively defined as a first end 211 and a second end 212. That is to say, the pivotal portion 24, the first end 211, and the second end 212 have an angle equal to a central angle of the track slot 21.

The carrier 2 in the instant embodiment is fixed on the first shaft 11 by using the combining portion 23 to screw to the mounting portion 111, and a main surface of the carrier 2 and a center axis of the first shaft 11 are approximately arranged at the same plane, but the instant disclosure is not limited thereto.

As shown in FIGS. 2A and 2B, the driving structure 3 is sleeved at the first shaft 11, and the driving structure 3 is configured to be driven by the second shaft 12 to rotate with respect to the first shaft 11. Specifically, an annularly guiding slot 33 (as shown in FIG. 1A) is formed on an outer surface of the driving structure 3. The driving structure 3 includes a first driving member 31 and a second driving member 32 detachably connected to the first driving member 31. The first driving member 31 and the second driving member 32 are sleeved at the cylindrical portion 112 of the first shaft 11 and are rotatable with respect to the first shaft 11.

Figure 3A:
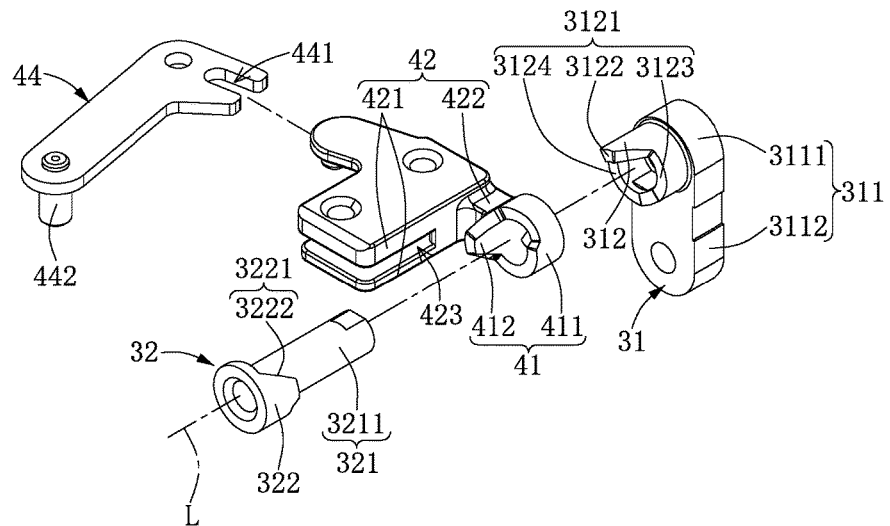
FIG. 3A is an exploded view of part of FIG. 2A.
Figure 3B:
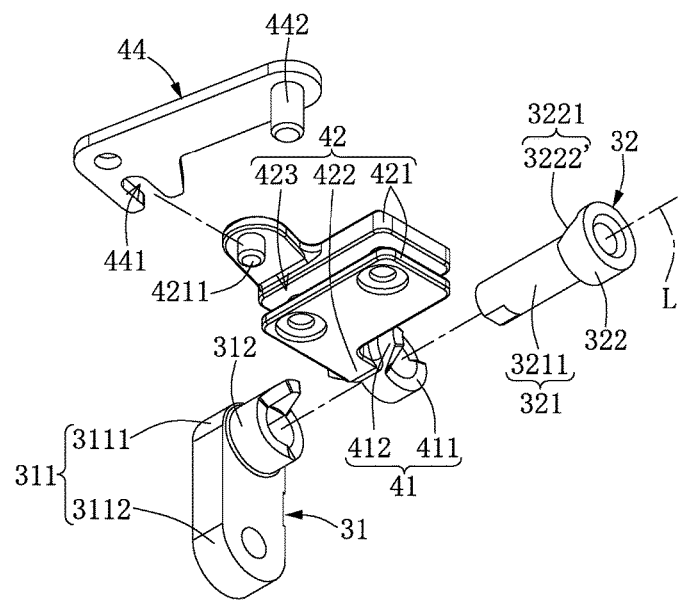
FIG. 3B is an exploded view of part of FIG. 2A from another perspective.

As shown in FIGS. 2A, 3A, and 3B, the first driving member 31 includes a connecting body 311 and a first cam 312. The connecting body 311 has a first portion 3111 and a second portion 3112 respectively sleeved at the first shaft 11 and the second shaft 12. The first cam 312 is integrally extended from the first portion 3111 and is sleeved at the first shaft 11. An edge of the first cam 312 (i.e., the left edge of the first cam 312 shown in FIG. 3A) arranged away from the first portion 3111 is defined as a first flange 3121.

Moreover, the second driving member 32 includes a connecting tube 321 and a second cam 322. The connecting tube 321 is sleeved at the first shaft 11 and is detachably inserted into the first cam 312 of the first driving member 31. The second cam 322 is integrally connected to an end of the connecting tube 321 (i.e., the left end of the connecting tube 321 shown in FIG. 3A) arranged away from the first cam 312. An edge of the second cam 322 (i.e., the right edge of the second cam 322 shown in FIG. 3A) facing the first cam 312 is defined as a second flange 3221. Part of an outer surface of the connecting tube 321 arranged between the first cam 312 and the second cam 322 is defined as a slot bottom 3211, and the first flange 3121 and the second flange 3221 are respectively connected to two opposite ends of the slot bottom 3211.

In other words, the first flange 3121, the second flange 3221, and the slot bottom 3211 surroundingly co-define the guiding slot 33 (as shown in FIG. 1A). The first flange 3121 and the second flange 3221 face to each other and are not complementary in shape. Specifically, when the first flange 3121 is stacked on the second flange 3221, the first flange 3121 and the second flange 3221 have a gap therebetween. It should be noted that the boundary of the guiding slot 33 is defined by the first flange 3121 and the second flange 3221 to from a non-spiral construction.

Figure 4:
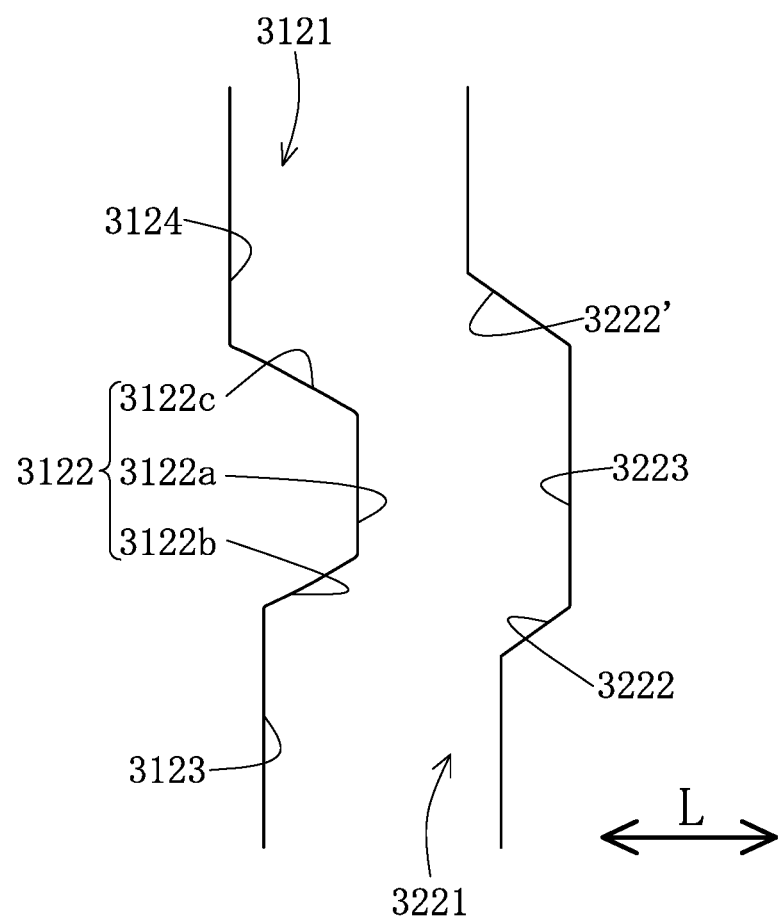
FIG. 4 is a schematic view showing the first flange and the second flange of the dual-shaft synchronous transmission device.

Please refer to FIG. 4, which shows a planar view of the first flange 3121 and the second flange 3221 by spreading the first flange 3121 and the second flange 3221. The first flange 3121 has a first hill-shaped edge 3122, a front edge 3123 connected to an end of the first hill-shaped edge 3122, and a rear edge 3124 connected to the other end of the first hill-shaped edge 3122. The first hill-shaped edge 3122 has a hilltop segment 3122a, an uphill segment 3122b connected to an end of the hilltop segment 3122a, and a downhill segment 3122c connected to the other end of the hilltop segment 3122a. The front edge 3123 is connected to the uphill segment 3122b, and the rear edge 3124 is connected to the downhill segment 3122c.

In the FIG. 4, the first hill-shaped edge 3122 is a trapezoid, and each of the front edge 3123 and the rear edge 3124 is a straight line. A distance between the front edge 3123 and the hilltop segment 3122a is slightly less than a distance between the rear edge 3124 and the hilltop segment 3122a, but the instant disclosure is not limited thereto.

The second flange 3221 has two second hill-shaped edges 3222, 3222' and a connecting edge 3223 connected to the two second hill-shaped edges 3222, 3222'. When the first hill-shaped edge 3122 is orthogonally projected onto the second flange 3221 in a direction parallel to the longitudinal direction L to form a projecting region, the projecting region is located between the two second hill-shaped edges 3222, 3222'. In the instant embodiment, the projecting region is arranged at the connecting edge 3223, and two opposite ends of the projecting region are respectively connected to the two second hill-shaped edges 3222, 3222'. Moreover, a height of one of the second hill-shaped edges 3222, 3222' is different from that of the other one, but the instant disclosure is not limited thereto.

As shown in FIGS. 2A and 2B, the linkage assembly 4 includes a linking member 41 having an annular shape, a first connecting rod 42 connected to the linking member 41, two limiting members 43 (i.e., screws) installed on the first connecting rod 42, and a second connecting rod 44 linked to the first connecting rod 42. The linking member 41 and the first connecting rod 42 in the instant embodiment are integrally formed in one piece, but the instant disclosure is not limited thereto. For example, the linking member 41 can be welded to, engaged with, or screwed on the first connecting rod 42.

The linking member 41 is sleeved at the guiding slot 33 of the driving structure 3 (as shown in FIG. 1A), and the linking member 41 is configured to be driven by the guiding slot 33 so as to reciprocately move in the longitudinal direction L with respect to the driving structure 3 (as shown in FIGS. 5A through 9B).

Figure 1B:
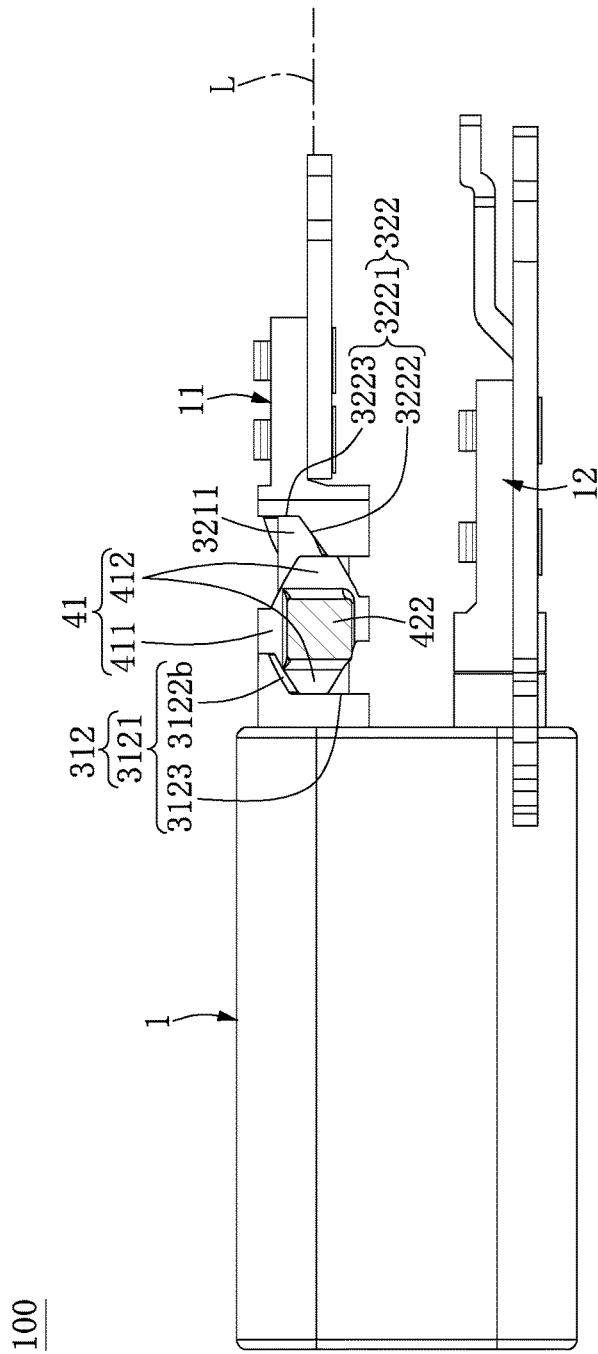
FIG. 1B is a cross-sectional view of FIG. 1A along a cross-sectional line IB-IB.

Specifically, as shown in FIGS. 3A and 3B, the linking member 41 includes a ring portion 411 sleeved at the slot bottom 3211 and a guiding portion 412 extended from the ring portion 411. A width of the ring portion 411 in the longitudinal direction L is equal to or less than a smallest distance between the first flange 3121 and the second flange 3221, so the guiding portion 412 can be driven by at least one of the first flange 3121 and the second flange 3221 to move the linking member 41 with respect to the driving structure 3. The guiding portion 412 in the instant embodiment has two trapezoid blocks (as shown in FIG. 1B) integrally extended from two opposite edges of the ring portion 411, but the instant disclosure is not limited thereto.

Thus, the linkage assembly 4 of the dual-shaft synchronous transmission device 100 is installed on the driving structure 3 by using the annularly linking member 41 to sleeve at the guiding slot 33, so the linking member 41 is stronger than conventional bumps and the connection between the linking member 41 and the driving structure 3 is more stable than conventional transmission devices.

As shown in FIGS. 2A and 2B, the first connecting rod 42 is movably installed on the carrier 2, and the first connecting rod 42 is configured to move in the longitudinal direction L with respect to the carrier 2. Specifically, as shown in FIGS. 2A, 3A, and 3B, the first connecting rod 42 has two sheets 421 and a fixing portion 422 integrally connected to the linking member 41 and the two sheets 421. The fixing portion 422 in the instant embodiment is connected to the ring portion 411, and the connecting region of the ring portion 411 is substantially arranged between the two trapezoid blocks of the guiding portion 412.

Moreover, as shown in FIGS. 2A, 3A, and 3B, the two sheets 421 and the fixing portion 422 surroundingly co-define a concavity 423. The carrier 2 passes through the concavity 423 to arrange the two elongated holes 22 in the concavity 423 and is connected to the first connecting rod 42 by using the limiting members 43. Specifically, as shown in FIG. 2A, the two limiting members 43 sequentially pass through one of the two sheets 421, the concavity 423, the two elongated holes 22, and the other sheet 421, thereby mounting the first connecting rod 42 onto the carrier 2. Each of the limiting members 43 is configured to move in the corresponding elongated hole 22 with respect to the carrier 2. One of the two sheets 421 (i.e., the top sheet 421 as shown in FIG. 3B) has a pillar 4211 arranged away from the fixing portion 422, and the pillar 4211 passes through the sliding hole 25 of the carrier 2.

Thus, the first connecting rod 42 is installed on the carrier 2 by using the concavity 423 to receive part of the carrier 2, so the connection between the first connecting rod 42 and the carrier 2 is more stable. The first connecting rod 42 moves more smooth by using the limiting members 43 to cooperate with the first connecting rod 42 and the carrier 2, thereby improving the operating stability of the dual-shaft synchronous transmission device 100.

In addition, in a non-shown embodiment, the carrier 2 can be provided with only one elongated hole 22, and the linkage assembly 4 can be provided with only one limiting member 43 having an elongated construction for movably inserting into the elongated hole 22, so the first connecting rod 42 still can be operated to move in the longitudinal direction L with respect to the carrier 2.

As shown in FIGS. 2A and 2B, the second connecting rod 44 is pivotally connected to the carrier 2 and is linked to the first connecting rod 42. The first connecting rod 42 is configured to drive the second connecting rod 44 to rotate with respect to the carrier 2.

Specifically, as shown in FIGS. 2A, 3A, and 3B, the second connecting rod 44 in the instant embodiment is a substantially L-shaped construction, a corner portion of the second connecting rod 44 is pivotally connected to the pivotal portion 24 of the carrier 2, and the pivotally connecting direction of the second connecting rod 44 in the instant embodiment is perpendicular to the main surface of the carrier 2. A notch 441 is recessed on an end of the second connecting rod 44 away from the corner portion, and a column 442 is arranged on the other end of the second connecting rod 44 away from the corner portion.

When the limiting members 43 move in the sliding hole 25, the first connecting rod 42 drives the second connecting rod 44 to rotate with respect to the carrier 2 by arranging the pillar 4211 of the first connecting rod 42 in the notch 441, thereby rotating the column 442 with respect to the carrier 2. In other words, the column 442 is movably arranged in the track slot 21 of the carrier 2, and the first end 211 and the second end 212 of the track slot 21 are respectively arranged at two opposite ends of a moving path of the column 442.

In addition, the cooperation of the first connecting rod 42 and the second connecting rod 44 in the instant embodiment adapts the pillar 4211 to insert into the notch 441, but the instant disclosure is not limited thereto. For example, each of the first connecting rod 42 and the second connecting rod 44 can be provided with a gearing edge, and the cooperation of the first connecting rod 42 and the second connecting rod 44 can be implemented by using the gearing edges engaged with each other.

As shown in FIGS. 2A and 2B, the elastic member 5 in the instant embodiment is a tension spring, but the instant disclosure is not limited thereto. An end of the elastic member 5 is fastened to the connecting portion 26 of the carrier 2, and the other end of the elastic member 5 is fastened to the adjacent limiting member 43. Thus, the linkage assembly 4 always receives an elastic force generated from the elastic member 5, so the guiding portion 412 of the linking member 41 maintains to contact with the first flange 3121. That is to say, the elastic member 5 is provided to effectively eliminate a gap between the linking member 41 and the first flange 3121, so the related motion between the linking member 41 and the first flange 3121 is smooth. Moreover, the elastic force generated from the elastic member 5 can be used to move the first connecting rod 42 toward the connecting portion 26.

Figure 5A:
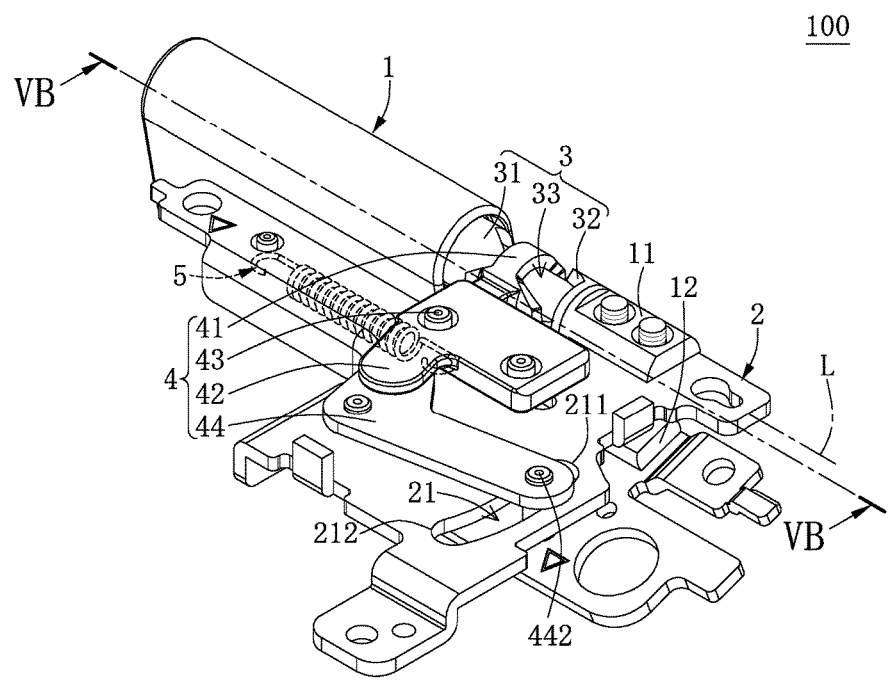
FIG. 5A is a perspective view showing the dual-shaft synchronous transmission device when the second shaft is rotated with respect to the first shaft at 20 degrees.
Figure 5B:
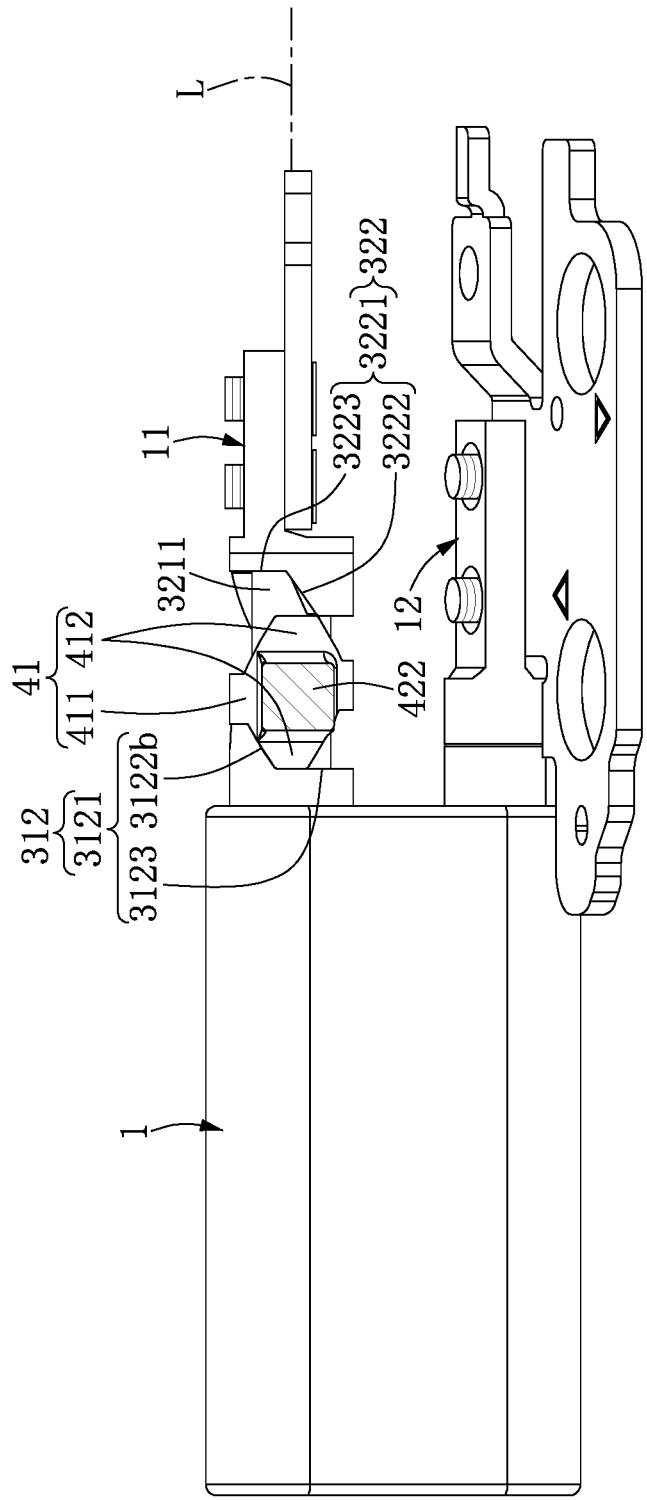
FIG. 5B is a cross-sectional view of FIG. 5A along a cross-sectional line VB-VB.
Figure 7A:
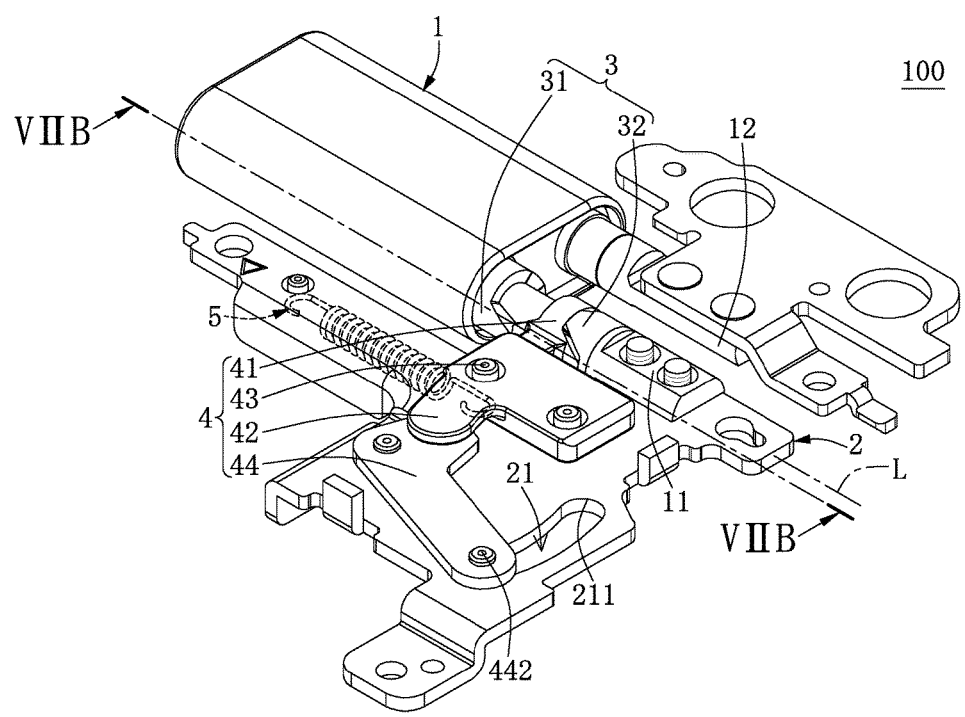
FIG. 7A is a perspective view showing the dual-shaft synchronous transmission device when the second shaft is rotated with respect to the first shaft at 180 degrees.
Figure 7B:
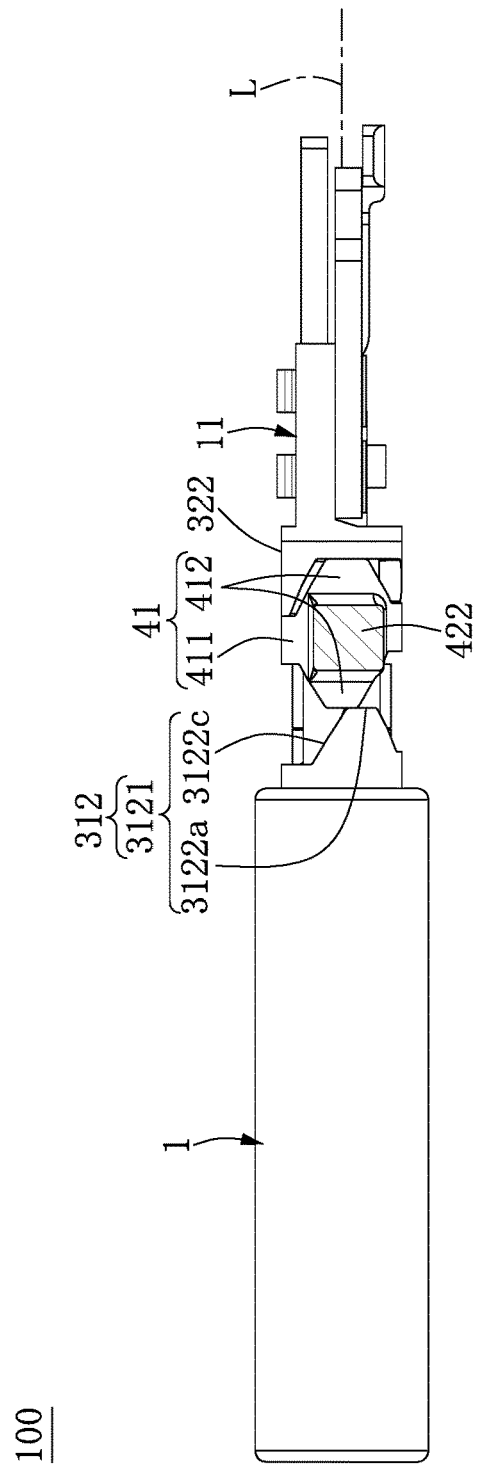
FIG. 7B is a cross-sectional view of FIG. 7A along a cross-sectional line VIIB-VIIB.
Figure 8A:
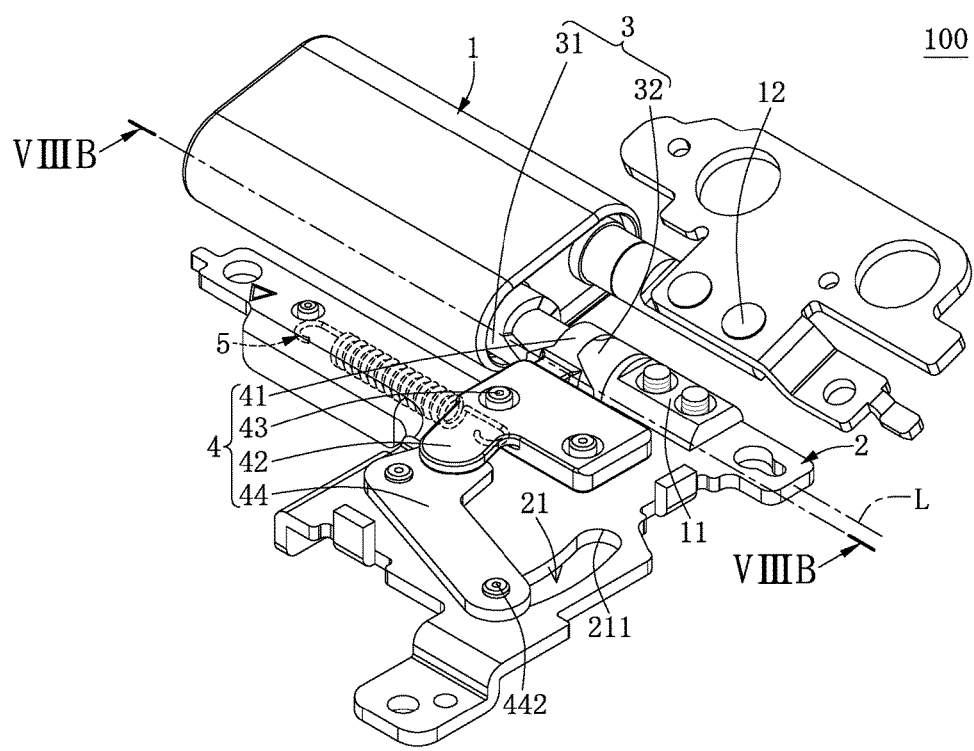
FIG. 8A is a perspective view showing the dual-shaft synchronous transmission device when the second shaft is rotated with respect to the first shaft at 200 degrees.
Figure 8B:
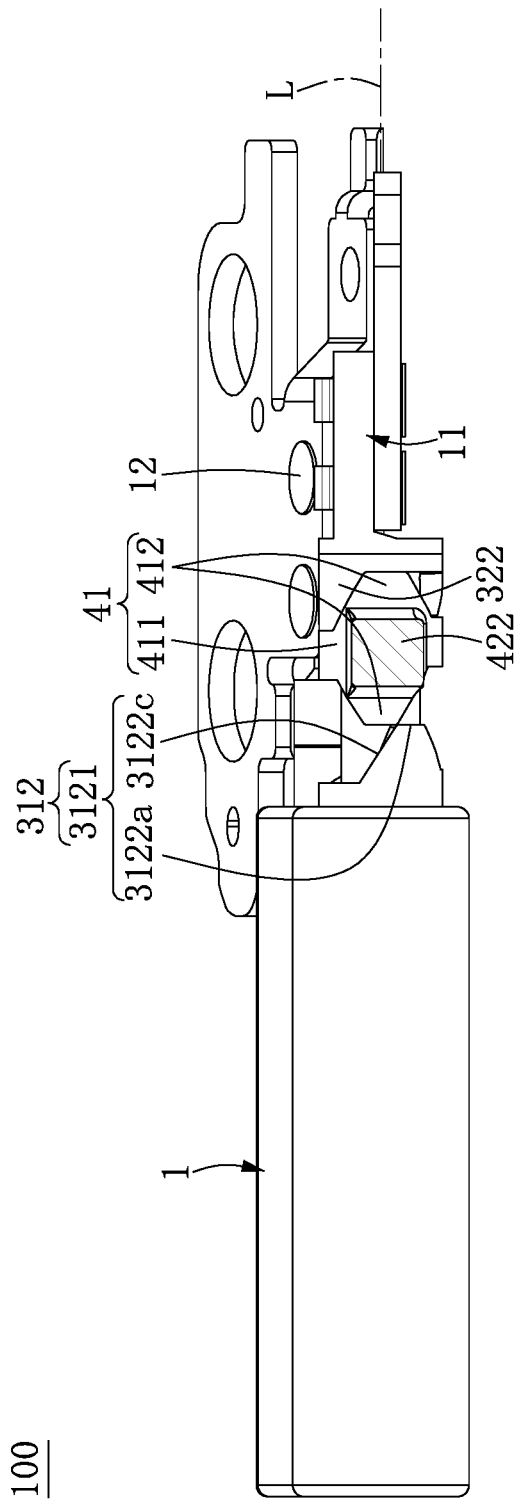
FIG. 8B is a cross-sectional view of FIG. 8A along a cross-sectional line VIIIB-VIIIB.
Figure 9A:
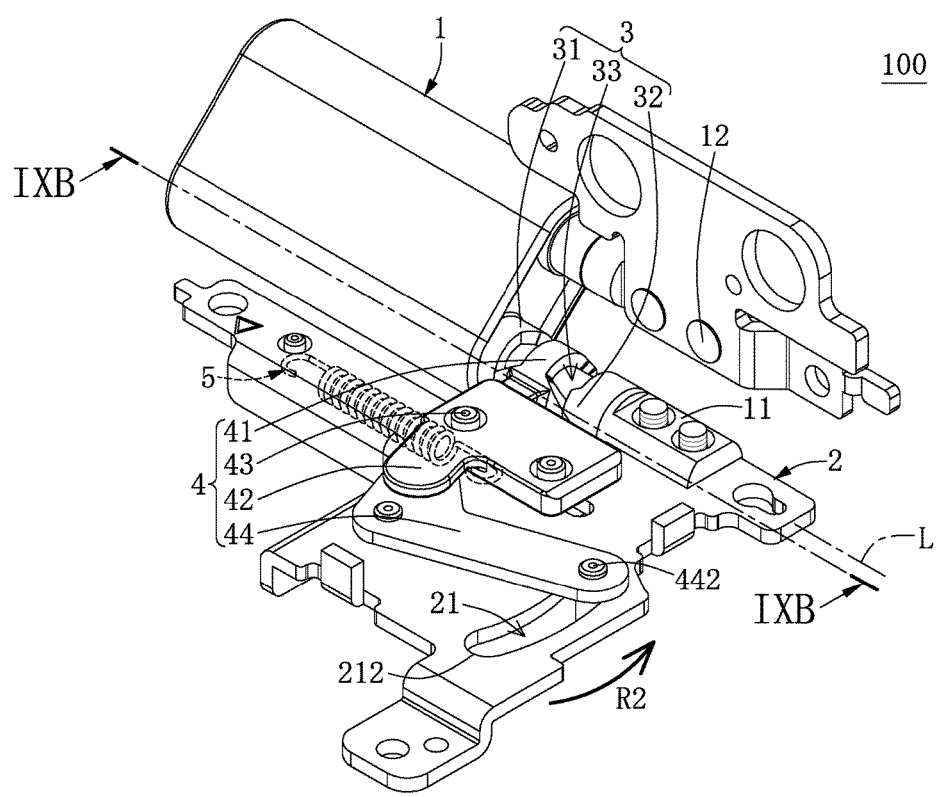
FIG. 9A is a perspective view showing the dual-shaft synchronous transmission device when the second shaft is rotated with respect to the first shaft at 270 degrees.
Figure 9B:
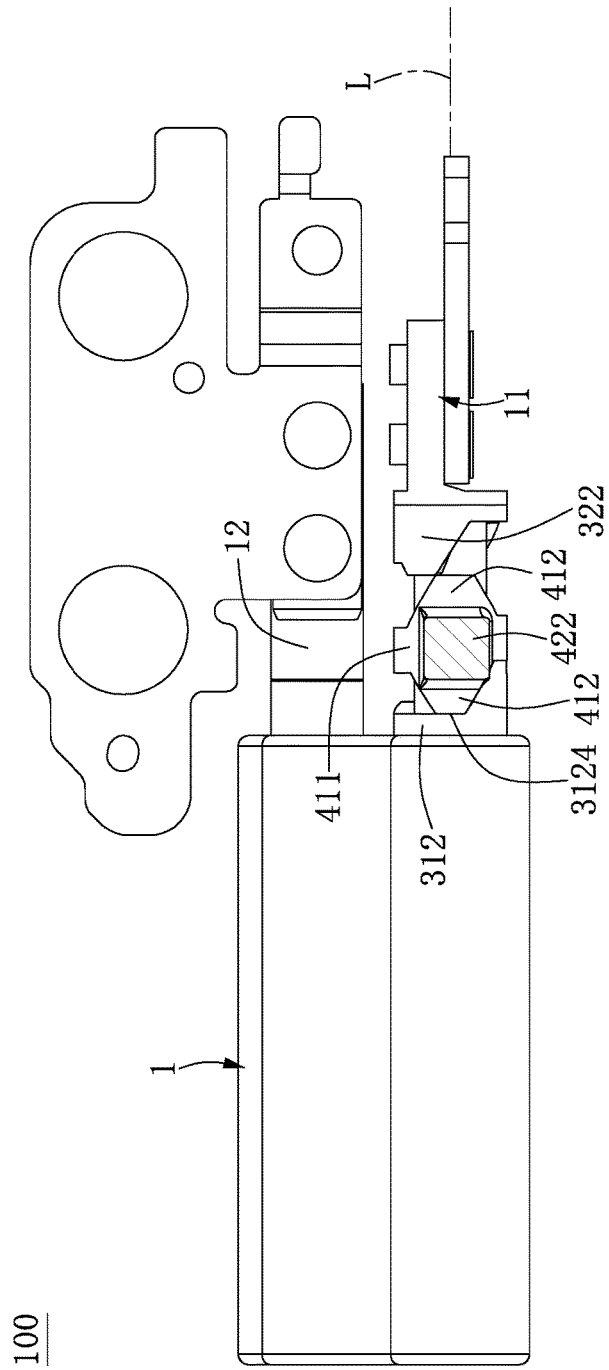
FIG. 9B is a cross-sectional view of FIG. 9A along a cross-sectional line IXB-IXB.

The construction of each component of the dual-shaft synchronous transmission device 100 has been disclosed in the above description, and the following description discloses the related features of the components when the dual-shaft synchronous transmission device 100 is operated. It should be noted that the related position between the first shaft 11 and the second shaft 12 as shown in FIGS. 1A and 1B is defined as 0 degree; the second shaft 12 as shown in FIGS. 5A and 5B is rotated with respect to the first shaft 11 at 20 degrees; the second shaft 12 as shown in FIGS. 6A and 6B is rotated with respect to the first shaft 11 at 80 degrees; the second shaft 12 as shown in FIGS. 7A and 7B is rotated with respect to the first shaft 11 at 180 degrees; the second shaft 12 as shown in FIGS. 8A and 8B is rotated with respect to the first shaft 11 at 200 degrees; and the second shaft 12 as shown in FIGS. 9A and 9B is rotated with respect to the first shaft 11 at 270 degrees.

Please refer to FIGS. 1A, 1B, and 5A through 9B, and occasionally reference to the above description. When the second shaft 12 is rotated by taking the first shaft 11 to be a rotation axis, the connecting body 311 (as shown in FIG. 3A) of the driving structure 3 is driven by the second shaft 12 to rotate the first cam 312 and the second cam 322 with respect to the first shaft 11 (i.e., the first cam 312 and the second cam 322 are rotated downwardly as shown in FIGS. 1B, 5B, 6B, 7B, 8B, and 9B). At the same time, the guiding portion 412 of the linking member 41 is driven by the first flange 3121 (or the second flange 3221) to move in the longitudinal direction L with respect to the first shaft 11. Accordingly, the first connecting rod 42 moves in the longitudinal direction L with respect to the carrier 2, and the first connecting rod 42 rotates the second connecting rod 44 with respect to the carrier 2 by using the pillar 4211 to push the notch 441 of the second connecting rod 44, thereby moving the column 442 in the track slot 21.

In summary, the guiding slot 33 of the driving structure 3 is constructed by the shape of the first flange 3121 or/and the second flange 3221 for effectively controlling the movement of the column 442, so the dual-shaft synchronous transmission device 100 can be provided for different demands by changing the movement of the column 442. For example, the guiding slot 33 in the instant embodiment constructed by the first flange 3121 and the second flange 3221 can be used to stop the movement of the column 442 when the linking member 41 moves on the hilltop segment 3122a (as shown in FIGS. 6A, 6B, 7A, and 7B), so the guiding slot 33 in the instant embodiment is totally different from conventional spiral tracks.

Figure 6A:
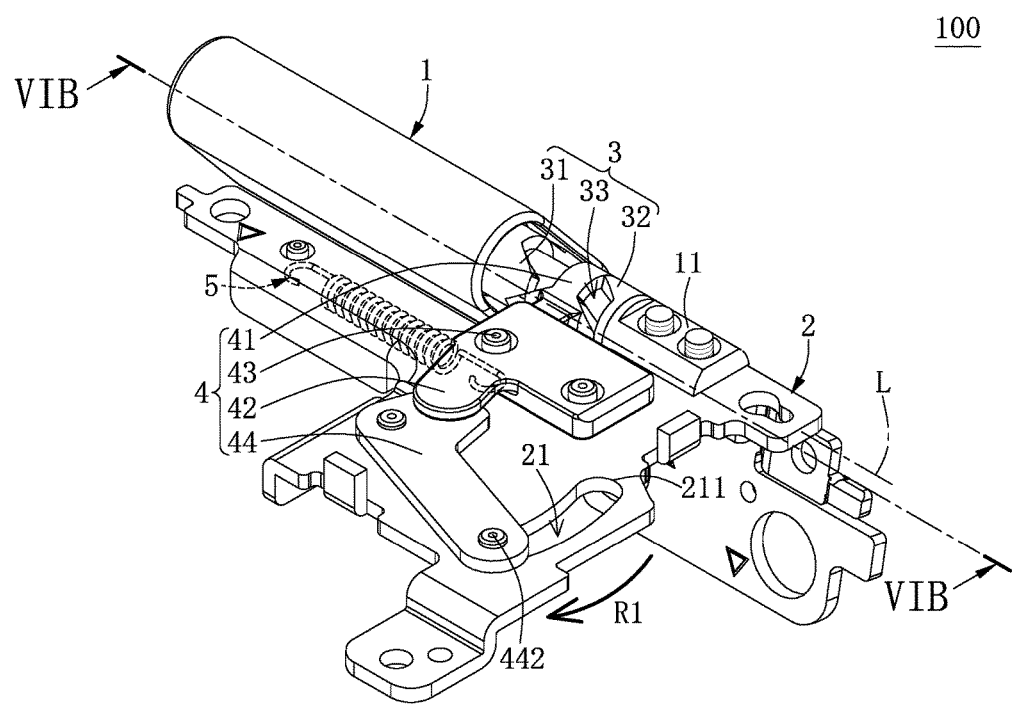
FIG. 6A is a perspective view showing the dual-shaft synchronous transmission device when the second shaft is rotated with respect to the first shaft at 80 degrees.
Figure 6B:
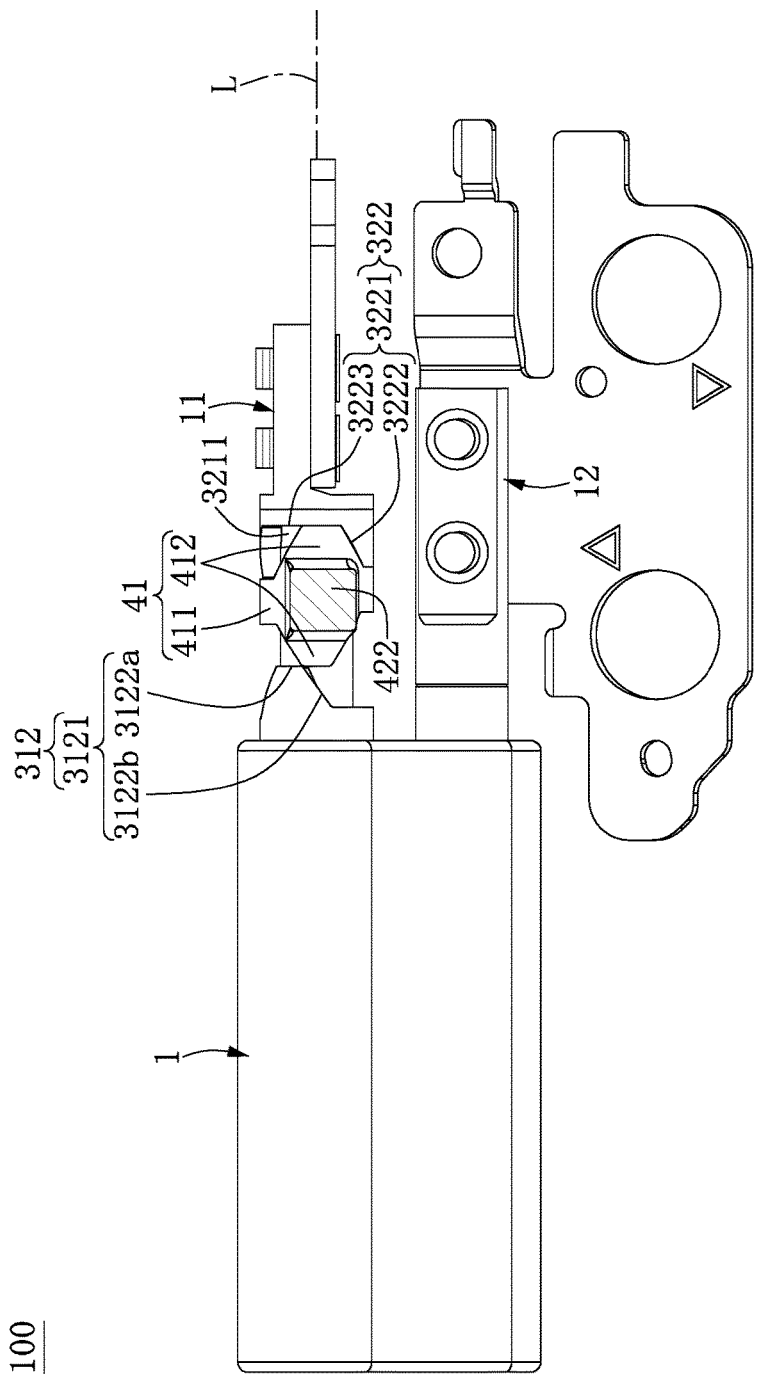
FIG. 6B is a cross-sectional view of FIG. 6A along a cross-sectional line VIB-VIB.

Specifically, as shown in FIGS. 1A, 1B, and 5A through 6B, the linking member 41 is configured to move on the uphill segment 3122b with respect to the driving structure 3 for rotating the second connecting rod 44 in a first rotational direction R1 (i.e., the clockwise direction shown in FIG. 6A). As shown in FIGS. 7A through 9B, the linking member 41 is configured to move on the downhill segment 3122c with respect to the driving structure 3 for rotating the second connecting rod 44 in a second rotational direction R2 (i.e., the counterclockwise direction shown in FIG. 9A) opposing to the first rotational direction R1.

Moreover, when the linking member 41 is abutted against the rear edge 3124 (as shown in FIGS. 9A and 9B), the column 442 and the first end 211 of the track slot 21 has a smallest distance; when the linking member 41 is abutted against the hilltop segment 3122a (as shown in FIGS. 6A and 6B), the column 442 and the first end 211 of the track slot 21 has a largest distance. Moreover, when the linking member 41 is abutted against the front edge 3123 (as shown in FIGS. 1A, 1B, 5A, and 5B), the distance between column 442 and the first end 211 is 1/3~1/5 of the distance between the first end 211 and the second end 212, and the distance between column 442 and the first end 211 in the instant embodiment is 1/4 of the distance between the first end 211 and the second end 212, but the instant disclosure is not limited thereto.

In addition, the first shaft 11, which can be named as the shaft 11, the carrier 2, the driving structure 3, and the linkage assembly 4 can be regarded as a transmission module (not labeled), and the applied scope of the transmission module is not limited to the dual-shaft synchronous transmission device 100. Moreover, the transmission module can be provided with the elastic member 5.

The descriptions illustrated supra set forth simply the preferred embodiments of the instant invention; however, the characteristics of the instant invention are by no means restricted thereto. All changes, alterations, or modifications conveniently considered by those skilled in the art are deemed to be encompassed within the scope of the instant invention delineated by the following claims

What is claimed is:

1. A dual-shaft synchronous transmission device, comprising:
   a hinge structure including:
      a first shaft having a longitudinal direction; and
      a second shaft parallel to the first shaft, wherein the second shaft is configured to rotate by taking the first shaft to be a rotation axis;
   a carrier fixed on the first shaft and having a track slot;
   a driving structure sleeved at the first shaft and configured to be driven by the second shaft to rotate with respect to the first shaft; wherein an annularly guiding slot is formed on an outer surface of the driving structure, and the guiding slot has a slot bottom, a first flange connected to an end of the slot bottom, and a second flange connected to an opposite end of the slot bottom,
   wherein the first flange and the second flange face to each other; the first flange has a first hill-shaped edge, the second flange has two second hill-shaped edges, when the first hill-shaped edge is orthogonally projected onto the second flange in a direction parallel to the longitudinal direction to form a projecting region, the projecting region is located between the two second hill-shaped edges; and a linkage assembly including;

a linking member having an annular shape and sleeved at the slot bottom of the guiding slot, wherein the linking member is configured to be driven by at least one of the first flange and the second flange to move in the longitudinal direction with respect to the driving structure;

a first connecting rod connected to the linking member and movably installed on the carrier, wherein the first connecting rod is configured to move in the longitudinal direction with respect to the carrier; and a second connecting rod pivotally connected to the carrier and having a column inserted into the track slot, wherein the second connecting rod is linked to the first connecting rod, and the first connecting rod is configured to drive the second connecting rod to rotate with respect to the carrier for moving the column in the track slot, wherein the linking member includes a ring portion sleeved at the slot bottom of the guiding slot and a guiding portion extended from the ring portion, the guiding portion is configured to be driven by at least one of the first flange and the second flange to move the linking member with respect to the driving structure.

2. The dual-shaft synchronous transmission device as claimed in claim 1, wherein the first hill-shaped edge has a hilltop segment, an uphill segment connected to an end of the hilltop segment, and a downhill segment connected to the other end of the hilltop segment; the linking member is configured to move on the uphill segment with respect to the driving structure for rotating the second connecting rod in a first rotational direction, the linking member is configured to move on the downhill segment with respect to the driving structure for rotating the second connecting rod in a second rotational direction opposing to the first rotational direction.

3. The dual-shaft synchronous transmission device as claimed in claim 2, wherein the linking member is configured to move on the hilltop segment with respect to the driving structure for maintaining the related position between the second connecting rod and the carrier.

4. The dual-shaft synchronous transmission device as claimed in claim 2, wherein the track slot has a first end and a second end respectively arranged at two opposite ends of a moving path of the column; the first flange has a front edge connected to the uphill segment and a rear edge connected to the downhill segment; when the linking member is abutted against the rear edge, the column and the first end of the track slot has a smallest distance; when the linking member is abutted against the hilltop segment, the column and the first end of the track slot has a largest distance.

5. The dual-shaft synchronous transmission device as claimed in claim 1, wherein the first connecting rod has a concavity, the carrier passes through the concavity and is connected to the first connecting rod.

6. The dual-shaft synchronous transmission device as claimed in claim 5, wherein the first connecting rod has two sheets and a fixing portion integrally connected to the linking member and at least one of the two sheets, and the two sheets and the fixing portion surroundingly co-define the concavity; the carrier has at least one elongated hole parallel to the longitudinal direction, the linkage assembly includes at least one limiting member passing through the two sheets, the concavity, and the at least one elongated hole; the at least one limiting member is configured to move in the at least one elongated hole with respect to the carrier.

7. The dual-shaft synchronous transmission device as claimed in claim 1, wherein the second connecting rod is a substantially L-shaped construction, a corner portion of the second connecting rod is pivotally connected to the carrier, a notch is recessed on an end of the second connecting rod away from the corner portion, and the column is arranged on the other end of the second connecting rod away from the corner portion; the first connecting rod is configured to drive the second connecting rod to rotate with respect to the carrier by inserting part of the first connecting rod into the notch.

8. The dual-shaft synchronous transmission device as claimed in claim 1, wherein the driving structure comprises:

a first driving member including a connecting body and a first cam, wherein the connecting body has a first portion and a second portion respectively sleeved at the first shaft and the second shaft, the first cam is extended from the first portion and is sleeved at the first shaft, an edge of the first cam arranged away from the first portion is defined as the first flange; and a second driving member including a connecting tube and a second cam, wherein the connecting tube is sleeved at the first shaft and is detachably inserted into the first cam of the first driving member, the second cam is integrally connected to an end of the connecting tube arranged away from the first cam, an edge of the second cam facing the first cam is defined as the second flange, and part of an outer surface of the connecting tube arranged between the first flange of the first cam and the second flange of the second cam is defined as the slot bottom.

9. The dual-shaft synchronous transmission device as claimed in claim 1, wherein the second flange includes a connecting edge connected to the two second hill-shaped edges, the projecting region is arranged at the connecting edge, and two opposite ends of the projecting region are respectively connected to the two second hill-shaped edges.

10. A transmission module, comprising:

a shaft;

a carrier fixed on the shaft and having a track slot;

a driving structure sleeved at the shaft and configured to rotate with respect to the shaft; wherein an annularly guiding slot is formed on an outer surface of the driving structure, and the guiding slot has a slot bottom, a first flange connected to an end of the slot bottom, and a second flange connected to an opposite end of the slot bottom, wherein the first flange and the second flange face to each other; the first flange has a first hill-shaped edge, the second flange has two second hill-shaped edges, when the first hill-shaped edge is orthogonally projected onto the second flange in a direction parallel to the shaft to form a projecting region, the projecting region is located between the two second hill-shaped edges; and a linkage assembly including;

a linking member having an annular shape and sleeved at the slot bottom of the guiding slot, wherein the linking member is configured to be driven by at least one of the first flange and the second flange to move parallel to the shaft with respect to the driving structure;

a first connecting rod connected to the linking member and movably installed on the carrier, wherein the first connecting rod is configured to move parallel to the shaft with respect to the carrier; and a second connecting rod pivotally connected to the carrier and having a column inserted into the track slot, wherein the second connecting rod is linked to the first connecting rod, and the first connecting rod is configured to drive the second connecting rod to rotate with respect to the carrier for moving the column in the track slot, wherein the first connecting rod has a concavity, the carrier passes through the concavity and is connected to the first connecting rod, wherein the first connecting rod has two sheets and a fixing portion integrally connected to the linking member and at least one of the two sheets, and the two sheets and the fixing portion surroundingly co-define the concavity; the carrier has at least one elongated hole parallel to a longitudinal direction of the shaft, the linkage assembly includes at least one limiting member passing through the two sheets, the concavity, and the at least one elongated hole; the at least one limiting member is configured to move in the at least one elongated hole with respect to the carrier.

11. A dual-shaft synchronous transmission device, comprising:
 a hinge structure including:
  a first shaft having a longitudinal direction; and
  a second shaft parallel to the first shaft, wherein the second shaft is configured to rotate by taking the first shaft to be a rotation axis;
 a carrier fixed on the first shaft and having a track slot;
 a driving structure sleeved at the first shaft and configured to be driven by the second shaft to rotate with respect to the first shaft; wherein an annularly guiding slot is formed on an outer surface of the driving structure, and the guiding slot has a slot bottom, a first flange connected to an end of the slot bottom, and a second flange connected to an opposite end of the slot bottom,
 wherein the first flange and the second flange face to each other; the first flange has a first hill-shaped edge, the second flange has two second hill-shaped edges, when the first hill-shaped edge is orthogonally projected onto the second flange in a direction parallel to the longitudinal direction to form a projecting region, the projecting region is located between the two second hill-shaped edges; and
 a linkage assembly including;
  a linking member having an annular shape and sleeved at the slot bottom of the guiding slot, wherein the linking member is configured to be driven by at least one of the first flange and the second flange to move in the longitudinal direction with respect to the driving structure;
  a first connecting rod connected to the linking member and movably installed on the carrier, wherein the first connecting rod is configured to move in the longitudinal direction with respect to the carrier; and
  a second connecting rod pivotally connected to the carrier and having a column inserted into the track slot, wherein the second connecting rod is linked to the first connecting rod, and the first connecting rod is configured to drive the second connecting rod to rotate with respect to the carrier for moving the column in the track slot, wherein the driving structure comprises:
  a first driving member including a connecting body and a first cam, wherein the connecting body has a first portion and a second portion respectively sleeved at the first shaft and the second shaft, the first cam is extended from the first portion and is sleeved at the first shaft, an edge of the first cam arranged away from the first portion is defined as the first flange; and
  a second driving member including a connecting tube and a second cam, wherein the connecting tube is sleeved at the first shaft and is detachably inserted into the first cam of the first driving member, the second cam is integrally connected to an end of the connecting tube arranged away from the first cam, an edge of the second cam facing the first cam is defined as the second flange, and part of an outer surface of the connecting tube arranged between the first flange of the first cam and the second flange of the second cam is defined as the slot bottom.

* * * * *